(12) United States Patent
Guttenberger et al.

(10) Patent No.: US 10,396,617 B2
(45) Date of Patent: Aug. 27, 2019

(54) ELECTRONICALLY COMMUTATED DIRECT CURRENT MOTOR WITH INDIVIDUAL TERMINALS AND PLASTIC PARTS

(71) Applicant: BÜHLER MOTOR GMBH, Nürnberg (DE)

(72) Inventors: Richard Guttenberger, Greding (DE); Nikolaus Dietrich, Nürnberg (DE)

(73) Assignee: BÜHLER MOTOR GMBH, Nürnberg (DE)

( * ) Notice: Subject to any disclaimer, the term of this patent is extended or adjusted under 35 U.S.C. 154(b) by 116 days.

(21) Appl. No.: 15/482,996

(22) Filed: Apr. 10, 2017

(65) Prior Publication Data

US 2017/0302121 A1 Oct. 19, 2017

(30) Foreign Application Priority Data

Apr. 15, 2016 (DE) .......................... 10 2016 206 397

(51) Int. Cl.
*H02K 5/02* (2006.01)
*H02K 1/27* (2006.01)
*H02K 5/22* (2006.01)
*H02K 7/08* (2006.01)
*H02K 15/00* (2006.01)
(Continued)

(52) U.S. Cl.
CPC ................ *H02K 5/02* (2013.01); *H02K 1/27* (2013.01); *H02K 5/08* (2013.01); *H02K 5/15* (2013.01); *H02K 5/225* (2013.01); *H02K 7/08* (2013.01); *H02K 15/0062* (2013.01); *H02K 15/14* (2013.01); *H02K 3/522* (2013.01); *H02K 5/10* (2013.01); *H02K 5/1732* (2013.01); *H02K 11/33* (2016.01)

(58) Field of Classification Search
CPC ............ H02K 7/08; H02K 5/02; H02K 5/225
See application file for complete search history.

(56) References Cited

U.S. PATENT DOCUMENTS 2,650,992 A * 9/1953 Forss .................... H02K 5/1732
  292/256.63
4,350,914 A * 9/1982 Searle .................... H02K 1/148
  310/194

(Continued)

FOREIGN PATENT DOCUMENTS

DE           601 02 011 T2     9/2004
DE    10 2006 021 247 A1     11/2007
(Continued)

*Primary Examiner* — Dang D Le
(74) *Attorney, Agent, or Firm* — Westerman, Hattori, Daniels & Adrian

(57) ABSTRACT

An electronically commutated direct current motor with a housing, a housing cover, a bearing shield, a rotor and a stator, wherein the rotor includes a shaft and a permanent magnet and the stator consists of single terminals, which are provided with terminal insulation. The direct current motor ensures a space-saving construction connection of motor components or components with the housing of the electronic commutated direct current motor, conforming to its class, wherein additional connections or sealing elements are not required, wherein a firm and sealed connection can be manufactured upon demand and an easy integration of other functions and interfaces is possible.

17 Claims, 3 Drawing Sheets

(51) Int. Cl.
*H02K 5/08* (2006.01)
*H02K 5/15* (2006.01)
*H02K 15/14* (2006.01)
*H02K 5/10* (2006.01)
*H02K 3/52* (2006.01)
*H02K 5/173* (2006.01)
*H02K 11/33* (2016.01)

(56) References Cited

U.S. PATENT DOCUMENTS

| | | | | | |
|---|---|---|---|---|---|
| 4,780,953 | A * | 11/1988 | Wheeler | ............ | H02K 5/1285 |
| | | | | | 29/525 |
| 5,334,897 | A * | 8/1994 | Ineson | .................... | H02K 5/08 |
| | | | | | 310/401 |
| 6,011,339 | A * | 1/2000 | Kawakami | ............ | H02K 1/278 |
| | | | | | 310/208 |
| 6,150,743 | A * | 11/2000 | Van Dine | ................ | H02K 5/00 |
| | | | | | 310/43 |
| 6,538,353 | B2 * | 3/2003 | Marioni | ................ | H02K 1/148 |
| | | | | | 310/86 |
| 6,809,437 | B2 * | 10/2004 | Oohashi | .................. | H02K 3/24 |
| | | | | | 310/201 |
| 6,880,231 | B2 * | 4/2005 | Campbell | ............... | H02K 1/30 |
| | | | | | 29/596 |

FOREIGN PATENT DOCUMENTS

| | | |
|---|---|---|
| DE | 10 2011 086 768 A1 | 5/2013 |
| DE | 10 2013 007 592 A1 | 11/2013 |
| DE | 10 2013 017 975 A1 | 6/2015 |
| DE | 10 2014 220 201 A1 | 4/2016 |
| WO | 2015/067998 A2 | 5/2015 |

\* cited by examiner

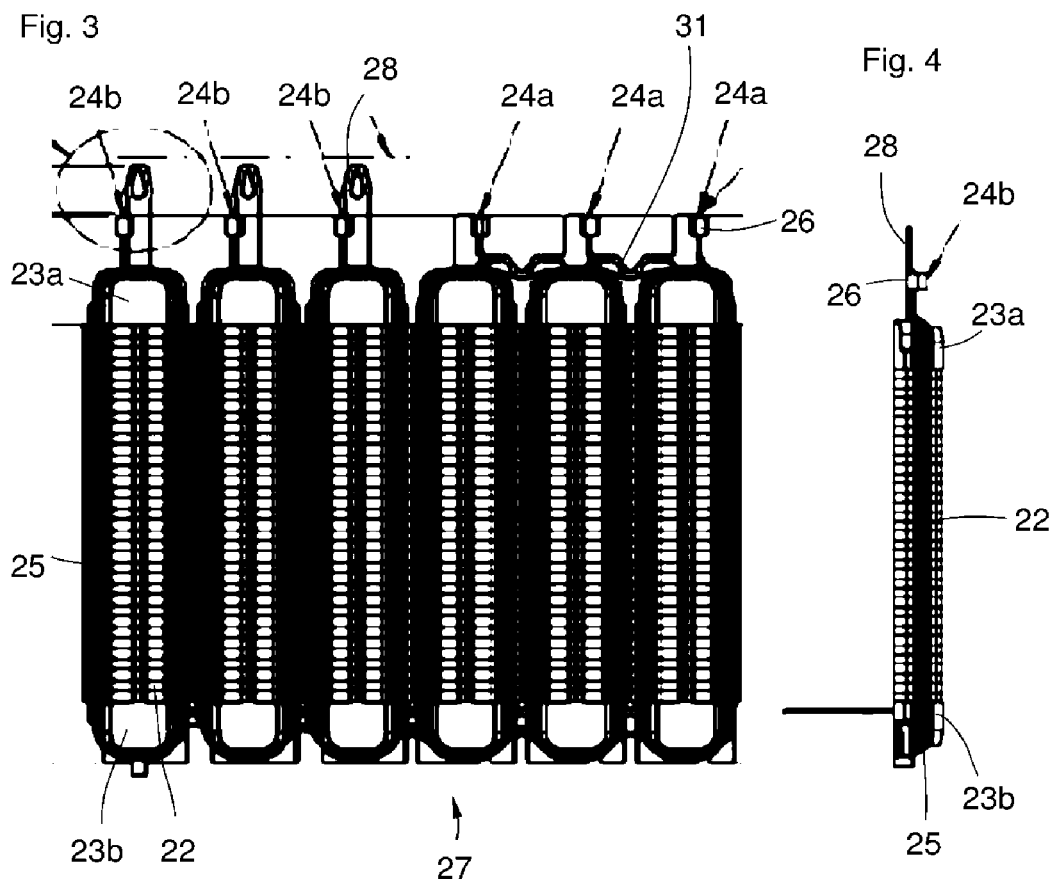
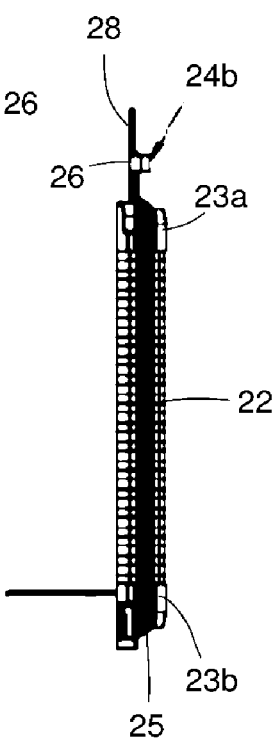
Fig. 3
Fig. 4
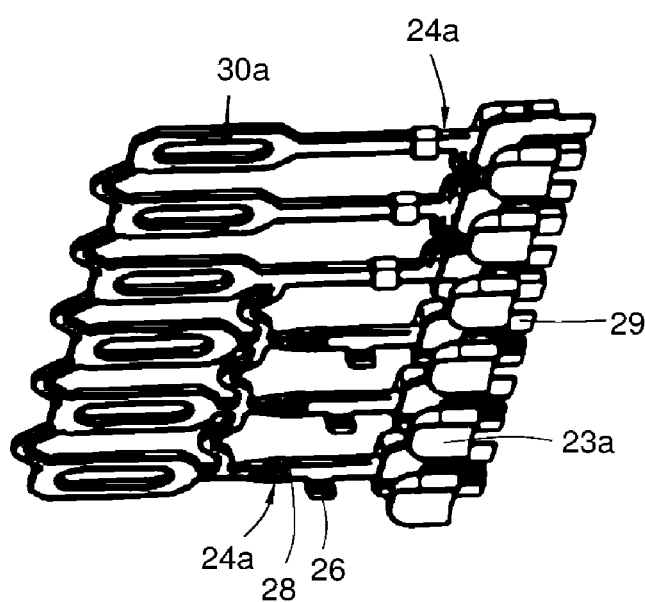
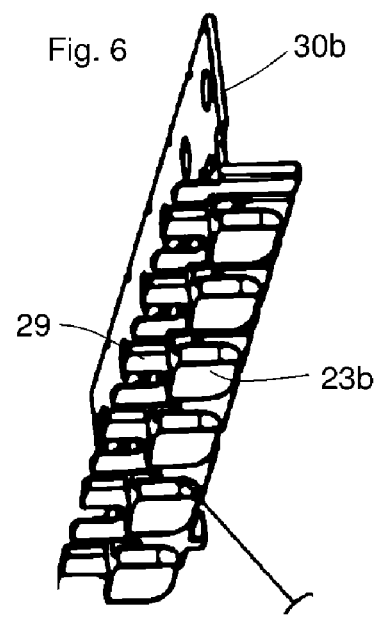
Fig. 5
Fig. 6

ELECTRONICALLY COMMUTATED DIRECT CURRENT MOTOR WITH INDIVIDUAL TERMINALS AND PLASTIC PARTS

BACKGROUND OF THE INVENTION

(1) Field of the Invention

The invention relates to an electronically commutated direct current motor, with a housing, a housing cover, a bearing shield, a rotor and a stator, wherein the rotor includes a shaft and a permanent magnet and the stator consists of single terminals, which are provided with terminal insulation.

(2) Description of Related Art Including Information Disclosed Under 37 CFR 1.97 And 1.98

From U.S. Pat. No. 6,538,353 B2 an electronic commutated direct current motor, conforming to its class is known, where the housing is manufactured via a prototype, whereby the stator is added to the housing. This manufacturing method requires a considerable tool effort and is inefficient especially with a large number of housing variants and smaller quantities.

BRIEF DESCRIPTION OF THE INVENTION

An object of the invention is to ensure a space-saving construction connection of motor components or components with the housing of an electronic commutated direct current motor, conforming to its class, wherein additional connections or sealing elements are not required, wherein a firm and sealed connection can be manufactured upon demand and an easy integration of other functions and interfaces is possible. Further, a cost-efficient process suitable for high quantities should also be implemented.

With the prefabricated housing, bearing shield and housing cover consisting of a technical plastic material, ordinary injection molding can be used for the manufacturing of housing. The use of a plastic housing enables the housing to be sealed in an easy manner without additional elements (if necessary) and adequately connects the housing components with each other and/or with attachment components. Essentially the cylindrical shell-shaped outer contour of the housing allows an easy manufacturing of this connection.

The stator can be pressed into the housing, as is known from the prior state of the art. Additional fastening possibilities exist with the use of the plastic housing, whereby the terminal insulation can be welded with the housing. In particular the welding process can produce a connection element free and, if necessary, very tight connection, with no additional sealing elements being required. Thus, a significantly improved stability can be achieved especially with a split stator, with a variety of single terminals. The cylinder shell-shaped outline allows you to produce a welded seam fully, by turning the housing.

The laser welding technology is a particularly suited welding process for connecting a plastic housing with motor components. This is a proven system to connect plastic components with one another. The housing material, consists of a laser light transparent material, while the connecting element consists of a laser light absorbing material.

According to a further embodiment of the invention it is intended that the stator insulation is immediately welded with the housing. The stator insulation can be welded with a continuous welded seam or preferentially three or via one of the stator terminals a corresponding number of welding regions with the motor housing. Thereby, the outer diameter of the stator insulation is larger than the inner diameter of the motor housing in the welding region. This results in an interference fit between the motor housing and the stator insulation. A laser beam directed from the motor housing permeates this, only slightly toned down, and hits upon a welding region of the stator insulation, is absorbed there for the most part and, thus warms the welding regions and the adjacent motor housing, until the plastic material melts. The motor housing and the stator insulation in the welding region move marginally closer to each other via the press fit and join closely together. The entire area, in which the welding partners lie close to one another, must be heated to produce a good welding connection. For this reason, the width of the welding region is adapted to the diameter of the laser beam. Further, the beam guidance can be adapted to the width of the welding regions, as the laser beam carries out a reciprocating axial motion.

It is proposed to connect the stator insulation to only one side of the stator at the motor housing, causing extensions or contractions through temperature fluctuations of the stator metal stack against the motor housing.

Similarly, the bearing shield can be welded to the housing. Here, however, no temperature compensation to a metallic module is required. There are higher requirements with regard to a sealing function. Therefore, a welded seam can and should be fully produced at this location.

Also in the welding of the housing and bearing shield, plastic materials are intended in accordance with an initial plastic material, which are permeable or are absorbent for the laser beams of the used laser in varying degrees. The housing consists of, at least in the welding region of a laser light, extensive permeable material, while the bearing shield or the stator insulation has a laser light absorbing material or a coating which absorbs well.

Alternatively, hereto the possibility exists to execute both joining partners from an essentially laser light permeable material. These special measures are required in order to establish a sufficiently solid and tight connection. Thus, the laser light should be well focused and its highest energy density should be concentrated in the welding region. In order to achieve a safe welding connection it is further intended to influence the laser beam in such a way that the area of the highest energy density is modulated in z-direction. At the same time it must be ensured that the surface of the housing does not become deformed. An energy application which is too high may not occur in the near surface regions. The used welding equipment therefore has a modular lens mechanism, with a collimating lens or a focusing lens that conducts an oscillation movement along the z-axis. The transmission or absorption coefficient is to be selected so that a sufficient heating of the welding location is possible without damaging the surface of the housing. An infrared laser with a wavelength range between 0.7 and 2.5 microns is suitable for the described welding process.

The productivity can be increased if the stator insulation and the bearing shield are welded parallel, in one work step.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which:

FIG. 3 shows a view of a wound pole stack;

FIG. 4 shows a side view of a wound single terminal;

FIG. 5 shows a first terminal insulation;

FIG. 6 shows a second terminal insulation;

Figure 1:
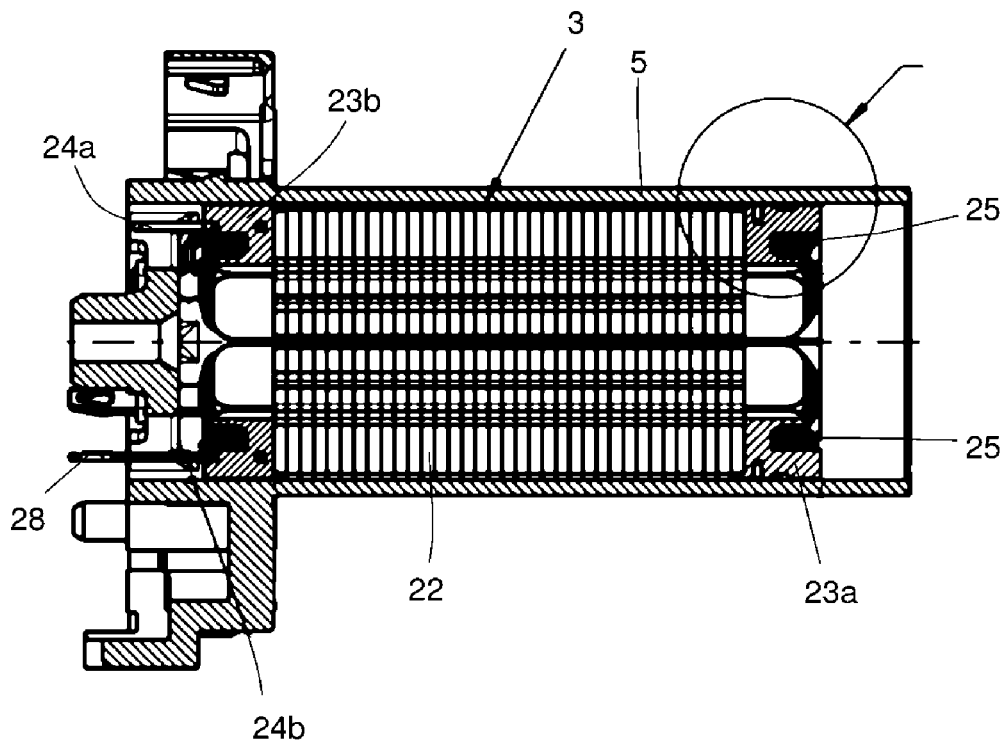
FIG. 1 shows a sectional view of a part of a direct current motor, according to the invention.

The reference numbers with index and the corresponding reference numbers without apostrophe refer to details with the same name in the drawings and the drawing description. It can also be used in another embodiment, the state of the art or another variant. The the description and the reference number list contain only reference numbers without index for the sake of simplicity.

DETAILED DESCRIPTION OF THE INVENTION

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 indicates a sectional view of a part of a direct current motor with a housing 5 and a stator 3, which consists of numerous single poles 22, terminal coils 25 and a terminal insulation 23a, 23b. The terminal coils 25 are electrically and mechanically connected with contact elements 24a, 24b. The housing 5 consists of a technical plastic material as well as the terminal insulation 23a, 23b. The stator 3 is welded via the terminal insulation 23a, 23b to the housing 5. The housing 5 consists of a material permeable to a laser light. The terminal insulation 23a, 23b consists of a laser light absorbing material. Additionally, a terminal contact 28 is depicted.

Figure 2:
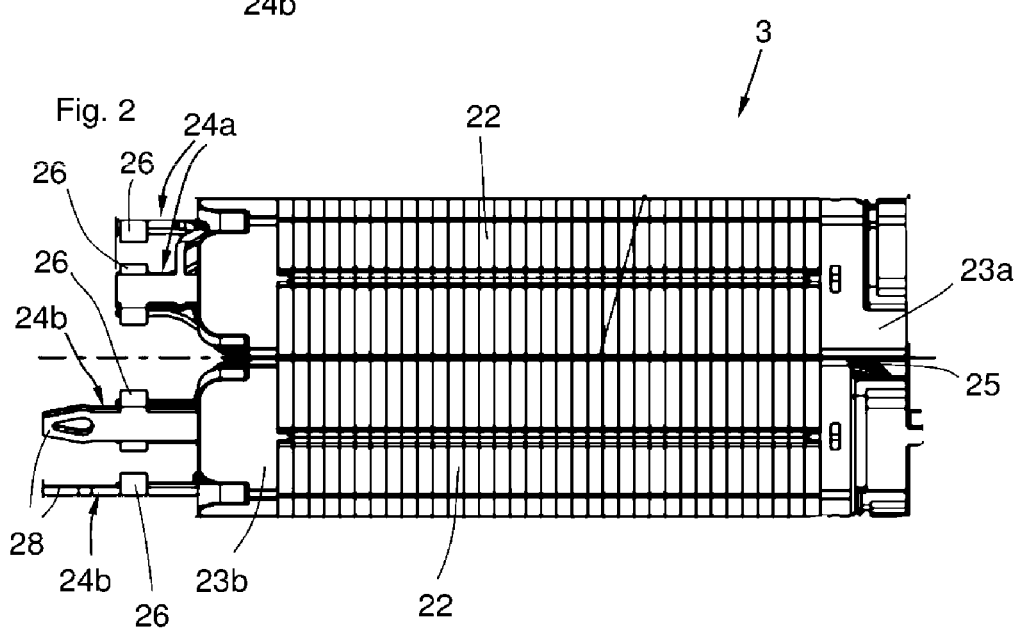
FIG. 2 shows a view of a stator.

FIG. 2 shows a view of a stator 3, according to FIG. 1, with the single pole 22 and the terminal insulation 23a, 23b. The single pole 22 consists of terminal metal sheets, whereby the individual sheets are added by stacking. The terminal insulation 23b shows additional contact elements 24a, 24b, with which the terminal coil 25 is electrically and mechanically connected. The contact elements 24a, 24b show crimp contacts 26 which are depicted as bent tongues and wire ends of the terminal coils 25 are kept mechanically (alternatively the wire ends can be welded or bonded without bent tongues) and are electrically connected with the contact element 24. The contact elements 24a, 24 are pressed into recesses of the terminal insulation 23. The contact element 24b show additional terminal contacts 28, via which the power supply occurs.

FIG. 3 shows a view of a wound pole stack 27. The pole stack 27 consists of several single terminals 22, which consist of one terminal metal packet, respectively and are connected via the terminal insulation 23a, 23b to form a chain. For this purpose, film hinges are provided between the individual terminal insulations 23a, 23b. The terminal insulations 23a, 23b are with slot linings 29, one single piece (see FIGS. 5 and 6), which are inserted into slots around the single pole 22. The terminal coils 25 are wound around the slot linings 29, the terminal insulation 23 and the single poles 22 and their ends are connected to the contact elements 24a, 24b, in particular, their crimp contacts 26 (alternatively the wire ends may be welded or bonded without bent tongues). A part of the contact elements 24 can be electrically connected by bridge 31 to a neutral point. The totality of all terminal coils 25 together form the stator winding 4 (see FIGS. 1, 7). The totality of all terminal insulations 23 together form the totality of all stator isolations 19 (see FIG. 7).

FIG. 4 shows a side view of a single pole 22, with the terminal insulations 23a, 23b, the contact element 24b, with crimp contact 26, terminal contact 28 and the terminal coil 25.

FIGS. 5 and 6 show the terminal insulations 23a or 23b. Together with the slot linings 29 they are one piece. The terminal insulations 23a is equipped with contact elements 24a, 24b, which are connected together via mounting tool 30a, temporarily. The terminal insulations 23b show mounting tools 30b, which serve as a support during the winding process.

Figure 7:
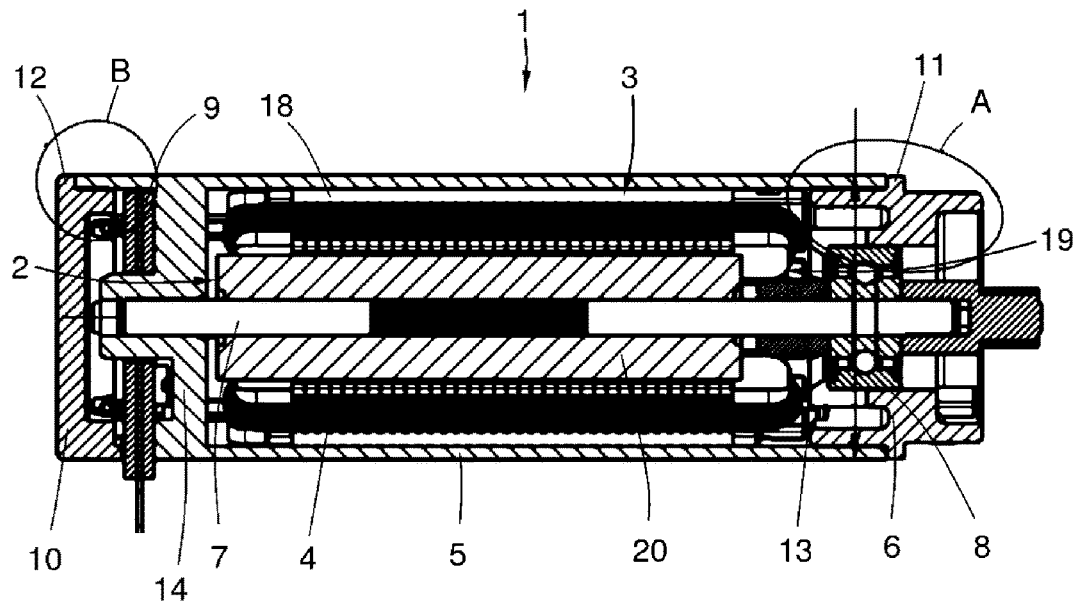
FIG. 7 shows a sectional view of a direct current motor, according to the invention.

FIG. 7 shows a section view through a direct current motor 1, according to the invention, with a housing 5, a stator 3, a bearing plate 6, a rotor 2, a partition wall 14, a circuit board 9 and a housing cover 10. The stator 3 comprises a stator metal packet 18 a stator isolation 19 and a stator winding 4. The rotor 2 includes a hollow cylindrical permanent magnet 20, a shaft 7 and a spacer bushing 13 and is on the one hand stored in a partition wall 14, and on the other hand in a ball bearing 8 in the bearing shield 6, mounted in a rotary motion. The bearing shield 6 shows a seal ring 11, where the housing 5 is located axially.

Figure 8:
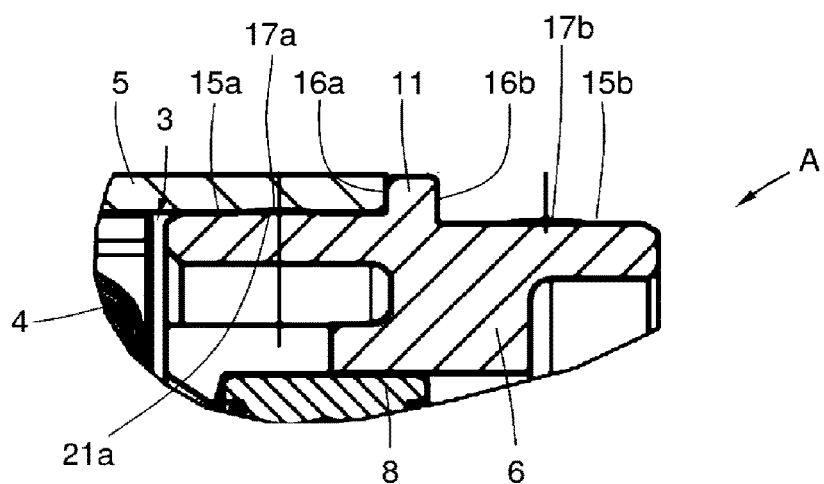
FIG. 8 shows an enlarged detail A of FIG. 7.

FIG. 8 shows an enlarged detail A. from FIG. 7 with the bearing shield 6, the ball bearing 8, the stator 3, the stator winding 4 and the housing 5. The bearing shield 6 includes the seal ring 11, which is axially limited by a first shoulder area 16a and a second shoulder area 16b, a first shaft 15a and a second shaft 15b. The first and the second shaft 15a, 15b show welding areas 17a, 17b, which are designed as enlarged areas in the diameter. The outside diameter of the bearing shield welding area 17a is larger than the inside diameter of the housing welding area 21, prior to installation. The housing 5 and the bearing shield 6 overlap axially in the region of the shaft 15a and the housing 5 is located in the first shoulder area 16a. The second shaft 15b serves for fastening of an attachment part. The attachment can be a gear or a pump. It is possible to weld a ring gear of a planetary gear directly onto shaft 15b of the bearing shield 6. For this purpose, the bearing shield welding range 17b is provided. The outside diameter of the bearing shield welding area 17b prior to installation is greater than the inside diameter of a ring gear welding range. After pressing of the bearing shield 6 into the housing of 5, these components are braced against each other. The tension dissolves partly by heating and melting of the welded areas 17a and 21a. Thereby, both parts move radially, marginally together and join closely together. With the production of a comprehensive welded seam a hermetically sealed welded seam is created. The shoulder area 16b, serves as an axial boundary for the gear ring.

Figure 9:
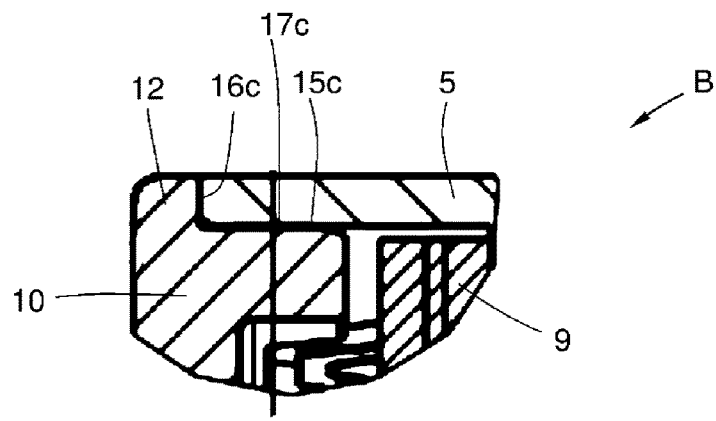
FIG. 9 shows an enlarged detail B of FIG. 7.

FIG. 9 shows an enlarged detail B. from FIG. 7 with the housing 5, the housing cover 10 and the circuit board 9. The housing cover 10 shows a flange-like edge 12, which is limited by a shoulder area 16c. The housing 5, lies axial at the shoulder area 16c and is a single piece, with the partition wall 14. The housing 5, the partition wall 14 and the housing cover 10, form a compartment space for the circuit board 9. Further the housing cover 10 comprises a shaft 15c which shows a bearing shield welding area 17c. The outside diameter of the bearing shield welding area 17c is larger than the inside diameter of a housing welding area 21 in the contact area, prior to installation.

It is to be understood that the present invention is not limited to the illustrated embodiments described herein. Various types and styles of user interfaces may be used in accordance with the present invention without limitation. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS

1 Direct current motor
2 Rotor
3 Stator
4 Stator winding
5 Housing
6 Bearing shield
7 Shaft
8 Ball bearings
9 Circuit board
10 Housing cover
11 Seal ring
12 Border
13 Spacer bushing
14 Partition wall
15 Shank
16 Shoulder surface
17 Bearing plate welding region
18 Stator metal packing
19 Stator insulation
20 Permanent magnet
21 Housing welding region
22 Single terminal
23 Terminal insulation
24 Contact element
25 Terminal coil
26 Crimp contact
27 Pole stack
28 Terminal contact
29 Slot lining
30 Mounting tool
31 Web

What is claimed is:

1. An electronically commutated direct current motor comprising:
    a housing;
    a circuit board;
    a housing cover attached to the housing for holding the circuit board within the housing;
    a bearing shield attached to the housing;
    a rotor having an elongated shaft and a permanent magnet; and
    a stator including
        a pole stack made up of a plurality of elongated single poles each single pole made up of a plurality of stacked metal sheets, each single pole having first and second ends,
        a first terminal insulation having slot linings, each slot lining being mechanically connected to the first end of each of the plurality of single poles and a second terminal insulation having slot linings, each slot lining being mechanically connected to the second end of each of the plurality of single poles to form a pole chain with the first and second terminal insulations being fastened to the housing, and
        terminal coils, each terminal coil being wound around a different select number of the plurality of single poles and the slot linings of the first and second terminal insulations associated with each single pole,
        the first terminal insulation of each single pole having first and second contact elements for each terminal coil,
        additional contact elements connected to said first contact elements and to the circuit board, the number of additional contact elements being less than the number of first contact elements, wherein the housing, the bearing shield and the housing cover are pre-manufactured, the housing having an essential cylindrical shell-shaped outer contour and the housing, the bearing shield and the housing cover being made of a plastic material.

2. The direct current motor, according to claim 1, wherein the stator is pressed in the housing.

3. The direct current motor, according to claim 1, wherein the single poles are fastened to the housing via the first and second terminal insulations.

4. The direct current motor, according to claim 3, wherein the first and second terminal insulations are welded to the housing.

5. The direct current motor, according to claim 1, wherein the bearing shield is welded to the housing.

6. The direct current motor, according to claim 1, wherein the housing cover is welded to the housing.

7. The direct current motor, according to claim 1, wherein the terminal insulation is connected via the laser welding technology with the housing.

8. The direct current motor, according to claim 1, wherein the bearing shield is connected via the laser welding technology with the housing.

9. The direct current motor, according to claim 1, wherein the housing cover is connected via the laser welding technology with the housing.

10. The direct current motor, according to claim 1, wherein the width of the welding region and the width of the laser beam or the beam guidance are coordinated with one another.

11. The direct current motor, according to claim 1, wherein the terminal insulation is only connected to one side of the stator at the housing.

12. The direct current motor, according to claim 1, wherein the housing has a welding region, and the welding region consists of a laser beam permeable plastic material.

13. The direct current motor, claim 1, wherein the bearing shield at least in the same bearing shield region consists of the same laser light absorbing material or shows the same laser light absorbing coating.

14. The direct current motor, according to claim 1, further comprising: a welding region in the bearing shield, and wherein at least in the bearing shield welding region, the bearing shield is permeable to the laser beam.

15. The direct current motor, according to claim 1, wherein the laser beam during the welding process is modulated so that the focal point oscillates along the path of the laser beam.

16. The direct current motor, according to claim 1, wherein the terminal insulation and the bearing shield are welded parallel.

17. The direct current motor, according to claim 1, wherein the different select number is three.

\* \* \* \* \*